No. 697,510. Patented Apr. 15, 1902.
H. D. MATTOX.
COMBINED CORN PLANTER AND FERTILIZER DISTRIBUTER.
(Application filed Nov. 21, 1901.)
(No Model.) 2 Sheets—Sheet 1.
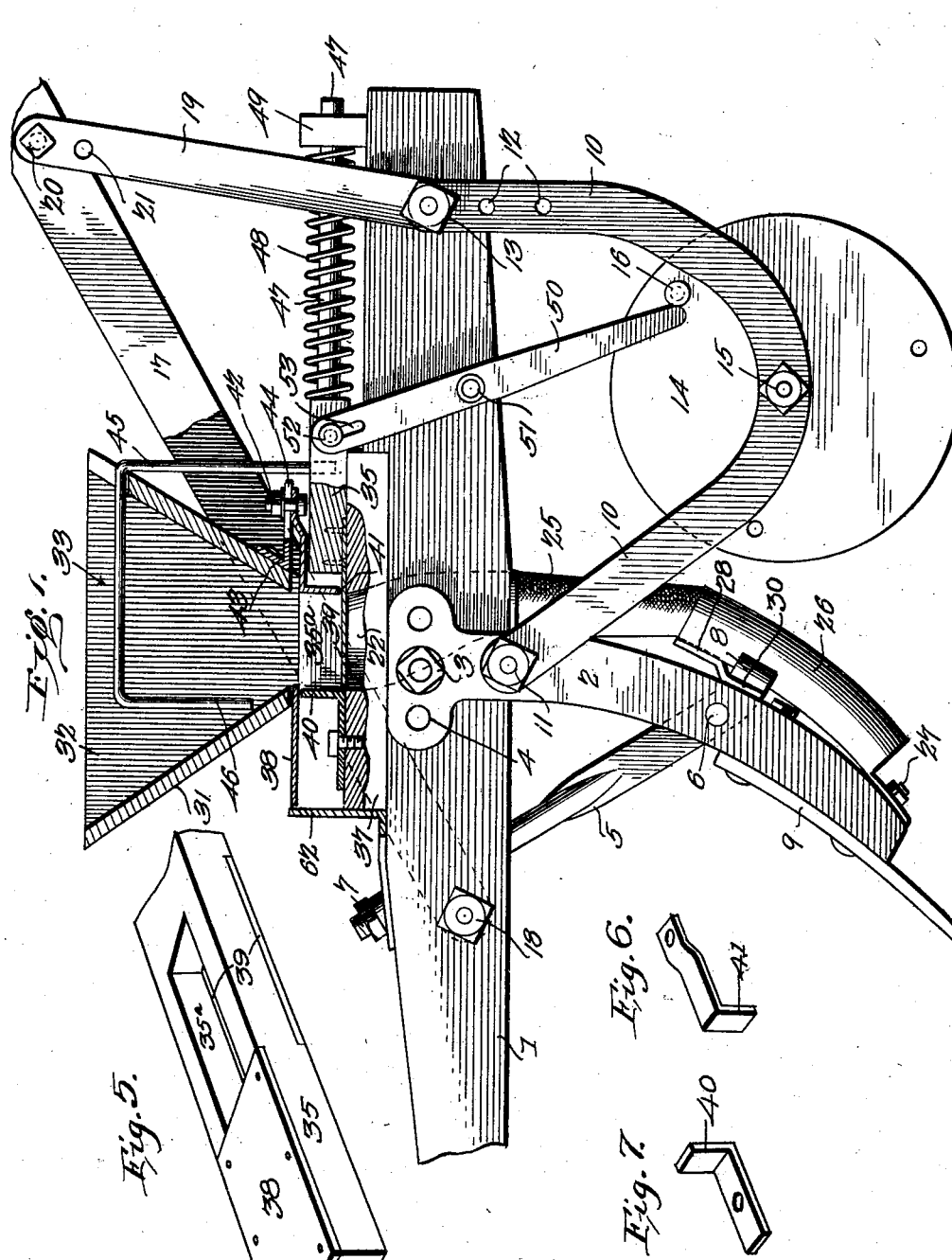
Witnesses
E. H. Stewart
J. W. Garner
H. D. Mattox, Inventor.
by C. A. Snow & Co.
Attorneys
THE NORRIS PETERS CO., PHOTO-LITHO., WASHINGTON, D. C.

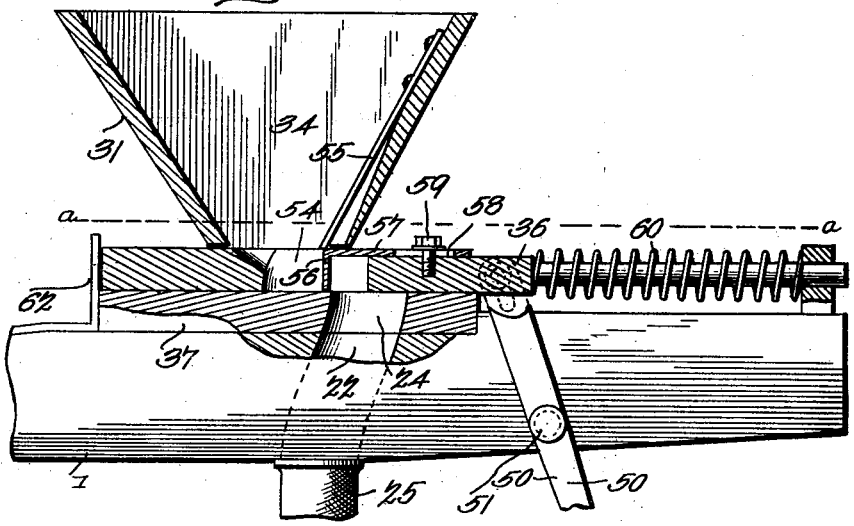
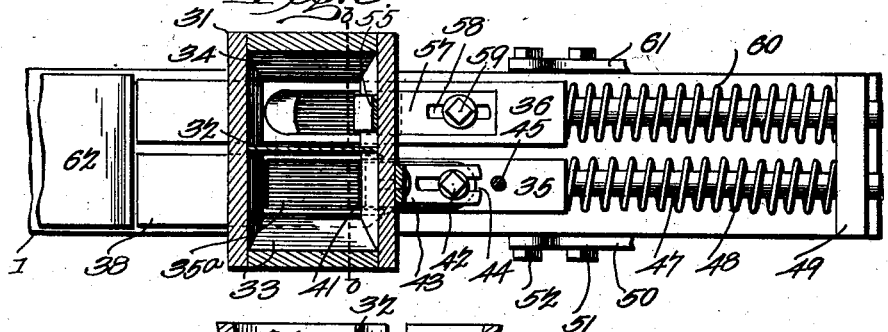
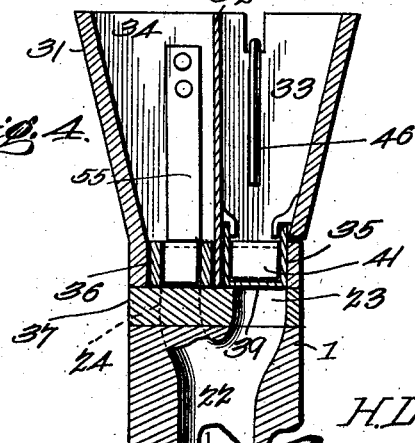

UNITED STATES PATENT OFFICE.

HENRY DAVISS MATTOX, OF HALEFORD, VIRGINIA.

COMBINED CORN-PLANTER AND FERTILIZER-DISTRIBUTER.

SPECIFICATION forming part of Letters Patent No. 697,510, dated April 15, 1902.

Application filed November 21, 1901. Serial No. 83,152. (No model.)

*To all whom it may concern:*

Be it known that I, HENRY DAVISS MATTOX, a citizen of the United States, residing at Haleford, in the county of Franklin and State of Virginia, have invented a new and useful Combined Corn-Planter and Fertilizer-Distributer, of which the following is a specification.

My invention is an improved combined corn-planter and fertilizer-distributer; and it consists in the peculiar construction and combination of devices hereinafter fully set forth and claimed.

One object of my invention is to provide a combined corn-planter and fertilizer-distributer which is adapted to drop the fertilizer in the hills at some distance from the corn planted therein, thereby preventing the fertilizer from injuring the plants at the initial stage of their germination and sprouting.

A further object of my invention is to effect improvements in the construction of the fertilizer-dropping mechanism to prevent the fertilizer from clogging in the hopper and in the fertilizer-slide, hence enabling my improved fertilizer-distributer and corn-planter to be used with damp fertilizer of the cheaper grades ordinarily used in planting corn.

A further object of my invention is to provide means to regulate the quantity of fertilizer dropped in each hill.

In the accompanying drawings, Figure 1 is a side elevation of a combined corn-planter and fertilizer-distributer constructed in accordance with my invention, partly in section, on a plane intersecting the fertilizer-compartment of the hopper and the fertilizer-slide. Fig. 2 is a detail vertical longitudinal sectional view of the same, taken on a plane intersecting the corn-compartment of the hopper and the corn or seed slide. Fig. 3 is a top plan view, partly in section through the hopper on a plane indicated by the line *a a* of Fig. 2; and Fig. 4 is a vertical transverse sectional view taken on a plane indicated by the line *b b* of Fig. 3. Fig. 5 is a detail perspective view of the fertilizer-slide, showing the drop and cut-off plates, respectively, on its lower and upper sides. Figs. 6 and 7 are detail perspective views, respectively, of the sweep element and fixed stop which coact with the fertilizer-slide.

In the embodiment of my invention I provide a beam 1, to which is attached the bifurcated upper end of a standard 2 by a bolt 3, which may be engaged with either of a series of adjusting-openings 4, with which said standard is provided. A brace-rod 5 has its upper end passed through and secured to the said beam at a point a suitable distance in advance of the standard, said brace-rod passing through the said standard and being connected thereto near its lower end by a bolt 6. A nut 7 is screwed to the upper end of the said brace-rod. The rear end of the latter is formed into a yoke 8. The adjusting-openings 4 being concentric with the bolt 6, the said standard 2 is adapted to be adjusted in such manner as to cause the furrow-opener 9, carried thereby, to run at any desired angle and depth in the soil.

A pair of hangers 10, which are of substantially U shape, have their front arms pivotally connected at their upper ends to the standard 2 by a bolt 11. The rear arms of the said hangers are provided with adjusting-openings 12. A bolt 13, which passes through an opening near the rear end of the beam 1 and through appropriate adjusting-openings 12 in the hangers, secures the latter at any desired vertical adjustment to the beam. A roller 14 is disposed between and has its bearings in the said hangers, as at 15, the said roller operating in rear of the furrow-opener. The said roller is provided on opposite sides with tappets 16, of which any desired number may be used and which may be disposed at any distance apart.

The handles 17 have their front ends pivotally connected to opposite sides of the beam 1 by a bolt 18. Braces 19, which have their lower ends pivotally connected to the bolt 13, have their upper ends adjustably connected to the handles by bolts 20, the said braces being provided with adjusting-openings 21. Thereby the rear ends of the handles may be raised or lowered, as will be understood.

The beam is provided at a suitable distance from its front end with a vertical discharge-opening 22 and with a pair of openings 23 24, which are respectively for the fertilizer and corn or other seeds, said openings 23 24 leading to the upper end of the opening 22, branching laterally therefrom, and the upper end of the fertilizer-opening 23 being some distance in advance of the upper end of said seed-opening 24. A flexible spout 25, which may be made of rubber, leather, or other suitable material, has its upper end secured to the under side of the beam 1 and communicates with the opening 22. The lower end of the said spout 25 is disposed in the upper end of a drill-tube 26, which is secured on the rear side of the standard 2 by one of the bolts, which secures the furrow-opening point 9 to the standard 2, as at 27, the upper portion of the said drill-tube lying against the rear side of the yoke 8 of brace-rod 5 and having a hook-strap 28 on its front side, which hook-strap has its front portion bifurcated and engaged with the said yoke, as at 30. Thereby the said drill-tube is adjustable vertically on the standard 2 with the furrow-opening point 9, the bolts which secure the latter to the standard passing through the slot which is formed in the said standard.

A hopper 31 is secured on the upper side of the standard and is divided by a longitudinal partition 32 into a fertilizer-compartment 33 and a seed-compartment 34. The bottoms of the respective compartments of the said hopper are formed by longitudinally-reciprocating fertilizer-slides 35 and a similarly-movable seed-slide 36. The said slides operate on a plate 37, which is secured on the upper side of the beam.

The fertilizer-slide 35 has a vertical longitudinal opening 35$^a$, the front portion of which is covered by a cut-off plate 38, which forms a part of and reciprocates with the slide. The latter is further provided with a drop-plate 39, which forms the bottom of the rear portion of said opening 35$^a$. A stop 40 is secured on the plate 37 at a point immediately in advance of the opening 23, the said stop operating in the said opening 35$^a$. A sweep 41, which is here shown as a longitudinally-adjustable gage, is disposed in the said opening 35$^a$ and operates in the rear portion thereof. The said sweep or gage is connected by a set-screw 42 or other suitable device to a bracket-arm 43, that projects from the rear side of the hopper and is here shown as provided with a longitudinal slot 44, in which the set-screw 42 operates. Thereby the sweep-gage may be longitudinally adjusted. From the foregoing description and by reference to the drawings, particularly Fig. 1 thereof, it will be understood that as the fertilizer-slide moves forwardly the drop-plate 39 thereof moves under the fertilizer-compartment of the hopper and over the opening 23 to cut off the latter and receive a charge of fertilizer from the hopper. On the rear stroke of said fertilizer-slide the cut-off plate 38 thereof moves under the fertilizer-compartment of the hopper, cutting off the feed of fertilizer therefrom, while the drop-plate 39 in coaction with the sweep-gage uncovers the opening 23 and drops the previously-accumulated charge of fertilizer in the opening 35$^a$, from the same through the opening 23, and from thence downwardly through the spout 25 and drill-tube 26 into the furrow or hill, the sweep-gage causing the fertilizer to be swept and dropped from the drop-plate 39 as the latter moves rearwardly in uncovering the opening 23. The function of the stop 40 is to prevent fertilizer from working forwardly in the opening in the fertilizer-slide and becoming packed therein. It will be understood that by adjusting the sweep-gage the capacity of the opening 35$^a$ in the fertilizer-slide may be varied, hence regulating the quantity of fertilizer dropped at each operation of the said slide. In order to prevent the fertilizer from packing and clogging in the hopper, I provide a stirrer 45, which is attached to and operates with the fertilizer-slide, extends forwardly through an opening in the rear side of the fertilizer-compartment of the hopper, and has a downwardly-extending arm 46, which reciprocates in said fertilizer-compartment. By this construction of the fertilizer-dropping mechanism my improved combined corn-planter and fertilizer-distributer is adapted for distributing the cheaper grades of fertilizer, such as acid phosphate, which are usually moist and somewhat sticky and have a tendency to pack.

The fertilizer-distributing slide is provided with a rearwardly-extending arm 47, on which is a coiled extensile spring 48. The front end of said spring bears against a shoulder at the front end of said arm, and the rear end of said spring bears against a stop 49, secured on the beam 1, said stop also forming a guide for the said arm 47. It will be understood that the function of the said spring is to move the fertilizer forward. A tappet-lever 50 is fulcrumed on one side of the beam 1, as at 51. The lower end of the said tappet-lever is disposed in the path of the tappet or tappets 16 on one side of the roller 14, so that said lever will be operated by said tappets as said roller rotates. The upper end of said tappet-lever is connected to the fertilizer-slide by a bolt or pin 52, which projects from one side of the fertilizer-slide and operates in a slot 53, with which said tappet-lever is provided. It will be understood that the tappets 16 of revolving roller 14 in coaction with the tappet-lever 50 impart the retrograde strokes to the fertilizer-slide.

The seed or corn slide 36 has a cup or opening 54, which by the reciprocatory motion of the said slide conveys corn from the corn-compartment of the hopper to the opening 24. A spring cut-off 55 is secured on the rear side of the seed-compartment of the hopper and bears on the upper side of the seed-slide 36. The latter is provided with an adjustable gage 56, which is disposed in the rear side of the opening 54 and has a rearwardly-extending arm 57, that bears on the seed-slide and is provided with a longitudinal slot 58. A set-screw 59 in said slot secures the said gage at any desired adjustment. The seed-slide is reciprocated by a spring 60 and a tappet-lever 61, the latter being operated by the tappets 16 of the roller 14 and by the said spring, as described in connection with tappet-lever 50.

Owing to the fact that the seed-opening 24 is in rear of the fertilizer-opening 23 the fertilizer is dropped somewhat in advance of the corn, so that the latter in germinating and sprouting is not injured by the fertilizer, as is likely to be the case when the fertilizer and corn are dropped in the same place.

A plate 62, secured on the beam in advance of the hopper, covers the front ends of the seed and fertilizer slides, as shown.

Having thus described my invention, I claim—

1. The combination of a fertilizer-hopper a slide under the same, said slide having a longitudinal fertilizer-opening, a drop-plate forming the bottom of the rear portion of said opening, and a cut-off plate covering the front portion of said opening, a fixed stop disposed in the front portion of said opening, under said cut-off plate, and a sweep element, relatively fixed and operating in the rear portion of said opening, over said drop-plate, and opposite said fixed stop, substantially as described.

2. The combination of a fertilizer-hopper, a slide under the same, said slide having a longitudinal fertilizer-opening, a drop-plate forming the bottom of the rear portion of said opening and a cut-off plate covering the front portion of said opening, a fixed stop disposed in the front portion of said opening, under said cut-off plate and a relatively fixed adjustable sweep-gage, disposed in the rear portion of said opening over said drop-plate and opposite said fixed stop, substantially as described.

In testimony that I claim the foregoing as my own I have hereto affixed my signature in the presence of two witnesses.

HENRY DAVISS MATTOX.

Witnesses:
CHAS. M. HIRT,
ANDREW HARPER.